（12） United States Patent
Nakajima et al.

(10) Patent No.: US 9,976,056 B2
(45) Date of Patent: May 22, 2018

(54) WATERPROOF SHEET AND WATERPROOF TREATMENT

(75) Inventors: Takeshi Nakajima, Osaka (JP); Takashi Hagiwara, Osaka (JP); Hisaharu Yamaguchi, Annaka (JP); Masahiro Yoda, Annaka (JP); Mitsuru Tomaru, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 620 days.

(21) Appl. No.: 13/435,563

(22) Filed: Mar. 30, 2012

(65) Prior Publication Data

US 2012/0247033 A1  Oct. 4, 2012

(30) Foreign Application Priority Data

Mar. 31, 2011 (JP) .................. 2011-077757

(51) Int. Cl.
E04B 1/684 (2006.01)
C09D 183/04 (2006.01)
C09D 183/12 (2006.01)
B32B 7/12 (2006.01)
E04B 1/68 (2006.01)

(52) U.S. Cl.
CPC ......... C09D 183/04 (2013.01); C09D 183/12 (2013.01); C09J 7/22 (2018.01); C09J 7/25 (2018.01); C09J 7/38 (2018.01); C09J 2483/00 (2013.01); C09J 2483/006 (2013.01); Y10T 428/2852 (2015.01)

(58) Field of Classification Search
None
See application file for complete search history.

(56) References Cited

U.S. PATENT DOCUMENTS 5,709,056 A * 1/1998 Matsuyama ............. E04B 2/88
52/235
2006/0008662 A1 1/2006 Arai et al.
2006/0142472 A1 6/2006 Hirai et al.

FOREIGN PATENT DOCUMENTS

| JP | 4-5336 A | 1/1992 |
|----|----------|--------|
| JP | 8-198384 A | 8/1996 |
| JP | 2000-64068 A | 2/2000 |
| JP | 2001-81583 A | 3/2001 |
| JP | 2004-189945 A | 7/2004 |
| JP | 2007-16557 A | 1/2007 |
| JP | 4076673 B2 | 4/2008 |

(Continued)

OTHER PUBLICATIONS

Notification of First Office Action dated Jul. 11, 2014, in Chinese Patent Application No. 201210203306.8, with English translation.

(Continued)

Primary Examiner — Ronak C Patel
Assistant Examiner — Thomas A Mangohig
(74) Attorney, Agent, or Firm — Birch, Stewart, Kolasch & Birch, LLP

(57) ABSTRACT

A waterproof sheet comprising a rubber base and a pressure-sensitive adhesive layer of silicone resin or gel thereon is applicable to the boundary between an outdoor tank and a concrete pedestal. The waterproof sheet maintains waterproofness over a long period of time and is in long-term service without degradation of physical properties.

11 Claims, 4 Drawing Sheets

(56) References Cited

FOREIGN PATENT DOCUMENTS

JP            3166787 U      3/2011
WO    WO 2007/011538 A2    1/2007

OTHER PUBLICATIONS

European Search Report dated Jul. 17, 2012 for European Application No. 12160412.8.
Machine English language translation of JP 8-198384 (Aug. 6, 1996).

* cited by examiner

WATERPROOF SHEET AND WATERPROOF TREATMENT

CROSS-REFERENCE TO RELATED APPLICATION

This non-provisional application claims priority under U.S.C. § 119(a) on Patent Application No. 2011-077757 filed in Japan on Mar. 31, 2011, the entire contents of which are hereby incorporated by reference.

TECHNICAL FIELD

This invention relates to a waterproof sheet and a waterproof treating method, which are effectively applied to an outdoor tank resting on a concrete pedestal, typically a large volume tank resting on a concrete pedestal as often found in oil refinery plants, for preventing rainwater from entering the boundary between the bottom side of the tank and the concrete pedestal.

BACKGROUND ART

One problem associated with an outdoor tank resting on a concrete pedestal, typically a large volume tank resting on a concrete pedestal as often found in oil refinery plants, is that rainwater enters the boundary between the bottom side of the tank and the concrete pedestal. The problem is addressed by covering the boundary between the tank bottom and the concrete pedestal with a butyl-based pressure-sensitive adhesive rubber sheet for preventing the entry of rainwater. However, since the butyl-based PSA rubber sheet is poor in weather resistance, heat resistance and freeze resistance, it fails to prevent the entry of rainwater over a long period of time, allowing rust generation at the bottom of the outdoor tank, with potential tank failure.

CITATION LIST

Patent Document 1: JP-A H04-005336
Patent Document 2: JP-A H08-198384
Patent Document 3: JP-A 2000-064068
Patent Document 4: JP 4076673

SUMMARY OF INVENTION

An object of the invention is to provide a waterproof sheet which is effectively applied to the boundary between an outdoor tank and a concrete pedestal for maintaining waterproofness over a long period of time without degradation of physical properties, and a waterproof treating method.

In one aspect, the invention provides a waterproof sheet comprising a rubber base and a pressure-sensitive adhesive (PSA) layer disposed thereon, the adhesive layer comprising a pressure-sensitive adhesive silicone resin or gel.

In a preferred embodiment, the rubber base is formed of silicone rubber having a hardness of 10 to 90 on JIS A scale.

In a preferred embodiment, the pressure-sensitive adhesive layer is formed of a cured product of an addition cure silicone rubber composition, the addition cure silicone rubber composition comprising (A) 20 to 100 parts by weight of an organopolysiloxane containing at least two silicon-bonded alkenyl groups in a molecule, having the average compositional formula (1):

$$R^1_a SiO_{(4-a)/2} \qquad (1)$$

wherein $R^1$ is each independently a substituted or unsubstituted monovalent hydrocarbon group of 1 to 10 carbon atoms, and a is a positive number of 1.5 to 2.8, (B) 0 to 80 parts by weight of a resinous copolymer predominantly comprising $R_3SiO_{1/2}$ units and $SiO_2$ units, a molar ratio of $R_3SiO_{1/2}$ units to $SiO_2$ units being in a range of 0.5 to 1.5, wherein R is a substituted or unsubstituted monovalent hydrocarbon group, and R contains alkenyl in a total amount of at least 0.0001 mol/g, the total amount of components (A) and (B) being 100 parts by weight, (D) an organohydrogenpolysiloxane containing at least two silicon-bonded hydrogen atoms in a molecule in an amount of 0.5 to 30 parts by weight relative to 100 parts by weight of components (A) and (B) combined, the amount being such that a molar ratio of silicon-bonded hydrogen in component (D) to silicon-bonded alkenyl group in components (A) and (B) is in a range of 0.2 to 1.5, and (E) a catalytic amount of an addition reaction catalyst, the cured product having surface pressure-sensitive adhesion.

The addition cure silicone rubber composition may further comprise (C) a resinous copolymer predominantly comprising $R'_3SiO_{1/2}$ units and $SiO_2$ units, a molar ratio of $R'_3SiO_{1/2}$ units to $SiO_2$ units being in a range of 0.5 to 1.5, wherein R' is a substituted or unsubstituted monovalent hydrocarbon group, and R' does not contain or contains alkenyl in a total amount of less than 0.0001 mol/g, in an amount of 0 to 400 parts by weight relative to 100 parts by weight of components (A) and (B) combined, the amount being such that a molar ratio of silicon-bonded hydrogen in component (D) to silicon-bonded alkenyl group in components (A), (B), and (C) is in a range of 0.32 to 0.75 when component (C) contains alkenyl.

In a preferred embodiment, the pressure-sensitive adhesive layer has a hardness which is lower than that of the rubber base and in a range of 1 to 60 on Asker C hardness scale.

In a preferred embodiment, the pressure-sensitive adhesive layer has a bond strength of 0.5 to 10 N/25 mm to glass.

In a preferred embodiment, the rubber base has a thickness of 0.2 to 5 mm and the pressure-sensitive adhesive layer has a thickness of 0.3 to 3 mm.

Most often, the waterproof sheet is applied to the boundary between an outdoor tank and a concrete pedestal for waterproof treating the outdoor tank.

In another aspect, the invention provides a method of waterproof treating an outdoor tank rested on a concrete pedestal, comprising applying the waterproof sheet defined above across an externally exposed boundary between the tank and the pedestal, with the pressure-sensitive adhesive layer of the waterproof sheet being attached to the tank and the pedestal.

In this case, the pressure-sensitive adhesive layer of the waterproof sheet can be directly attached to the tank and the pedestal without a primer.

A sealant may be applied around the waterproof sheet. More particularly, the sealant is applied along the outer periphery of the pressure-sensitive adhesive layer of the waterproof sheet to form a sealing layer at the outer periphery of the pressure-sensitive adhesive layer. The sealant is typically a silicone sealant.

Throughout the disclosure, the term "pressure-sensitive adhesive" is abbreviated as PSA.

Advantageous Effects of Invention

Since the waterproof sheet maintains waterproofness over a long period of time, it is in long-term service without degradation of physical properties. The outdoor tank treating method ensures that the outdoor tank is treated waterproof at the bottom side in a simple manner.

DESCRIPTION OF EMBODIMENTS

Figure 1:
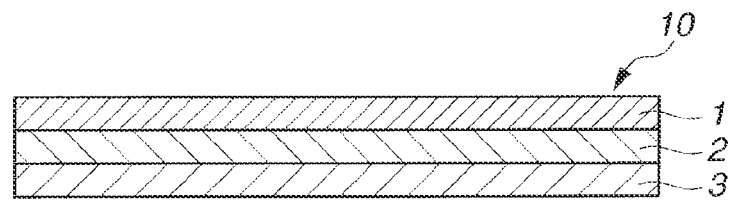
FIG. 1 is a cross-sectional view of a waterproof sheet of the invention.

Referring to FIG. 1, a waterproof sheet 10 is illustrated as comprising a rubber base 1 and a PSA layer 2 disposed on one surface of rubber base 1. Typically the PSA layer 2 is overlaid with a cover film 3 in a releasable manner. On use, the cover film 3 is peeled, and the adhesive layer 2 is attached to the desired member.

The rubber base is preferably made of silicone rubber because of its heat resistance, weather resistance and freeze resistance. The silicone rubber used herein is not particularly limited, and any of silicone rubbers obtained by curing prior art well-known silicone rubber compositions may be used. It is preferred from the standpoints of elasticity and rubber strength to use a silicone rubber having a hardness of 10 to 90, more preferably 20 to 80, and even more preferably at least 25, especially at least 40 and up to 80, especially up to 75 as measured by a type A Durometer according to JIS K6249. Rubber with a JIS A hardness of less than 10 may have poor strength whereas rubber with a hardness in excess of 90 may have poor elasticity.

The silicone rubber composition used herein may be of any cure type although the preferred silicone rubber composition may be of either addition (hydrosilylation) reaction cure type or organic peroxide cure type. The silicone rubber composition of addition reaction cure type may have a well-known formulation, typically comprising an alkenyl-bearing organopolysiloxane containing at least two alkenyl groups (typically vinyl) in a molecule, an organohydrogenpolysiloxane containing at least two, preferably at least three SiH groups (typically in an amount to give a molar ratio of SiH group to alkenyl group of 0.5 to 4), and a platinum group metal-based addition reaction catalyst, typically platinum or a platinum compound (typically in an amount of 1 to 1,000 ppm based on the alkenyl-bearing organopolysiloxane). The silicone rubber composition of organic peroxide cure type may also have a well-known formulation, typically comprising an organopolysiloxane containing at least two alkenyl groups in a molecule, and a curing amount (typically 1 to 10 parts by weight per 100 parts by weight of the organopolysiloxane) of an organic peroxide as curing agent.

As the silicone rubber composition, any commercially available products may be used. For example, commercially available silicone rubber compositions of the addition reaction cure type include KE-1935A/B, KE-1950-60A/B, and KEG-2000-40A/B from Shin-Etsu Chemical Co., Ltd. and commercially available silicone rubber compositions of the organic peroxide cure type include KE-551-U, KE-571-U, KE-1571-U, and KE-951-U from Shin-Etsu Chemical Co., Ltd.

The PSA layer is formed of a silicone resin or gel having pressure-sensitive adhesion. In particular, an addition cure composition may be used to form a layer having sufficient pressure-sensitive adhesion to tightly adhere and fixedly attach to the base and various members while maintaining a certain rubber hardness and rubber strength.

In a preferred embodiment, the PSA layer is formed of a cured product of an addition cure silicone rubber composition comprising the following components:

(A) an organopolysiloxane containing at least two silicon-bonded alkenyl groups in a molecule, (B) a resinous copolymer predominantly comprising $R_3SiO_{1/2}$ units and $SiO_2$ units wherein R is a substituted or unsubstituted monovalent hydrocarbon group and contains alkenyl, (D) an organohydrogenpolysiloxane containing at least two silicon-bonded hydrogen atoms (i.e., SiH groups) in a molecule, and (E) an addition reaction catalyst, the cured product having surface pressure-sensitive adhesion.

The addition cure silicone rubber composition may further comprise (C) a resinous copolymer predominantly comprising $R'_3SiO_{1/2}$ units and $SiO_2$ units wherein R' is a substituted or unsubstituted monovalent hydrocarbon group and does not contain or contains alkenyl in a less amount than the alkenyl content of component (B).

Component (A) is an organopolysiloxane containing, on average, at least two alkenyl groups in a molecule. The organopolysiloxane (A) has the average compositional formula (1).

$$R^1_a SiO_{(4-a)/2} \qquad (1)$$

Herein $R^1$ is each independently a substituted or unsubstituted monovalent hydrocarbon group of 1 to 10 carbon atoms, preferably 1 to 8 carbon atoms, and a is a positive number of 1.5 to 2.8, preferably 1.8 to 2.5, and more preferably 1.95 to 2.05. Examples of the silicon-bonded substituted or unsubstituted monovalent hydrocarbon group represented by $R^1$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl, and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which some or all hydrogen atoms are substituted by halogen atoms (e.g., fluorine, bromine or chlorine), cyano or other radicals, such as chloromethyl, chloropropyl, bromoethyl, trifluoropropyl, and cyanoethyl. Preferably methyl accounts for at least 90 mol % of the entire $R^1$.

At least two of $R^1$ must be alkenyl groups, preferably of 2 to 8 carbon atoms, more preferably 2 to 6 carbon atoms. The alkenyl content is preferably 0.0001 to 20 mol %, more preferably 0.001 to 10 mol %, and even more preferably 0.01 to mol % of the entire organic groups $R^1$ (i.e., substituted or unsubstituted monovalent hydrocarbon groups as illustrated above). The alkenyl group may be attached to the silicon atom at the end of the molecular chain, or a silicon atom midway the molecular chain, or both. It is preferred that the organopolysiloxane have at least alkenyl groups attached to the silicon atoms at both ends of the molecular chain.

While the degree of polymerization is not particularly limited, the organopolysiloxane used herein may be either liquid or gum-like at room temperature. Typically the organopolysiloxane has an average degree of polymerization of 50 to 20,000, preferably 100 to 10,000, and more preferably 100 to 2,000, as measured by gel permeation chromatography (GPC) versus polystyrene standards. With respect to the structure, the organopolysiloxane generally has a straight chain structure whose backbone is composed of recurring diorganosiloxane ($R^1_2SiO_{2/2}$) units and which is capped with a triorganosiloxy ($R^1_3SiO_{1/2}$) or hydroxydiorganosiloxy (($HO)R^1_2SiO_{1/2}$) group at either end of the molecular chain. However, it may have in part a branched or cyclic structure.

Component (B) is a resinous copolymer predominantly comprising $R_3SiO_{1/2}$ units and $SiO_2$ units. The resinous copolymer is a copolymer having three-dimensional network structure. Herein R is a substituted or unsubstituted monovalent hydrocarbon group, preferably of 1 to 10 carbon atoms, more preferably 1 to 8 carbon atoms. Examples of the monovalent hydrocarbon group represented by R include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl, and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which some or all hydrogen atoms are substituted by halogen atoms (e.g., fluorine, bromine or chlorine), cyano or other radicals, such as chloromethyl, chloropropyl, bromoethyl, trifluoropropyl, and cyanoethyl.

The resinous copolymer (B) may consist of $R_3SiO_{1/2}$ units and $SiO_2$ units, or may optionally further contain $R_2SiO$ units and $RSiO_{3/2}$ units wherein R is as defined above, in a total amount of up to 50%, preferably up to 40% of the total weight of the copolymer. A molar ratio of $R_3SiO_{1/2}$ units to $SiO_2$ units, [$R_3SiO_{1/2}/SiO_2$], is in a range of 0.5/1 to 1.5/1, preferably 0.5 to 1.3. If the molar ratio is outside the range, rubber hardness and strength fall outside the desired ranges. Further, the resinous copolymer (B) should preferably have at least two alkenyl groups in a molecule. The content of alkenyl group is at least 0.0001 mol/g, preferably 0.0001 to 0.003 mol/g, and more preferably 0.0002 to 0.002 mol/g. If the alkenyl content is less than 0.0001 mol/g, no sufficient rubber physical properties are available. An alkenyl content of more than 0.003 mol/g may lead to too high rubber hardness and low bond strength.

The resinous copolymer (B) may be either a liquid one having fluidity at room temperature (25° C.), for example, having a viscosity of at least 10 mPa-s, preferably at least 50 mPa-s, or a solid one having no fluidity. The resinous copolymer may be prepared from hydrolysis of chlorosilanes or alkoxysilanes by a technique well known in the art.

Components (A) and (B) are compounded in such amounts that component (A) is 20 to 100 parts by weight, preferably 30 to 90 parts by weight, and component (B) is 0 to 80 parts by weight, preferably 10 to 70 parts by weight, provided that the total amount of components (A) and (B) is 100 parts by weight. If the amount of component (A) is too small, the composition loses rubber elasticity and becomes brittle. If the amount of component (A) is excessive, pressure-sensitive adhesion and strength become insufficient. If the amount of component (B) is excessive, pressure-sensitive adhesion lowers and rubber physical properties are considerably degraded.

In addition to the resinous copolymer as component (B), another resinous copolymer may be compounded in the composition as component (C) if necessary. Component (C) is a resinous copolymer predominantly comprising $R'_3SiO_{1/2}$ units and $SiO_2$ units, the resinous copolymer being a copolymer having three-dimensional network structure. Herein R' is a substituted or unsubstituted monovalent hydrocarbon group, preferably of 1 to 10 carbon atoms, more preferably 1 to 8 carbon atoms. Examples of the monovalent hydrocarbon group represented by R' include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl, and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which some or all hydrogen atoms are substituted by halogen atoms (e.g., fluorine, bromine or chlorine), cyano or other radicals, such as chloromethyl, chloropropyl, bromoethyl, trifluoropropyl, and cyanoethyl.

The resinous copolymer (C) may consist of $R'_3SiO_{1/2}$ units and $SiO_2$ units, or may optionally further contain $R'_2SiO$ units and $R'SiO_{3/2}$ units wherein R' is as defined above, in a total amount of up to 50%, preferably up to 40% of the total weight of the copolymer. A molar ratio of $R'_3SiO_{1/2}$ units to $SiO_2$ units, [$R'_3SiO_{1/2}/SiO_2$], is in a range of 0.5/1 to 1.5/1, preferably 0.5 to 1.3. If the molar ratio is outside the range, pressure-sensitive adhesion becomes lower. The resinous copolymer (C) should have an alkenyl content of less than 0.0001 mol/g (i.e., 0 to 0.0001 mol/g), preferably up to 0.00005 mol/g (i.e., 0 to 0.00005 mol/g), and more preferably be free of alkenyl. An alkenyl content in excess of 0.0001 mol/g adversely affects pressure-sensitive adhesion.

The resinous copolymer (C) may be either a liquid one having fluidity at room temperature (25° C.) or a solid one having no fluidity. A resinous copolymer which is solid at room temperature is preferable for pressure-sensitive adhesion of a cured product. The resinous copolymer may be prepared from hydrolysis of chlorosilanes or alkoxysilanes by a technique well known in the art.

The resinous copolymer (C) may be compounded in an amount of 0 to 400 parts by weight, preferably 0 to 300 parts by weight relative to 100 parts by weight of components (A) and (B) combined. If component (C) is excessive, pressure-sensitive adhesion and rubber physical properties may become poor.

It is also preferred from the standpoints of rubber physical properties and pressure-sensitive adhesion that the total content of alkenyl groups available from the resinous copolymers as components (B) and (C) be 0.00001 to 0.002 mol/g, more preferably 0.00005 to 0.001 mol/g.

Component (D) is an organohydrogenpolysiloxane containing at least two, preferably at least three silicon-bonded hydrogen atoms (i.e., SiH groups) in a molecule. It serves as a curing agent for curing the composition in that SiH groups in the molecule undergo hydrosilylation (or addition) reaction with silicon-bonded alkenyl groups in components (A), (B) and (C) to form crosslinks. Preferably the organohydrogenpolysiloxane (C) has at least two (typically 2 to 200), more preferably 3 to 100, and even more preferably 3 to 50 silicon-bonded hydrogen atoms in a molecule, and is represented by the average compositional formula (2):

$$R^2_b H_c SiO_{(4-b-c)/2} \quad (2)$$

wherein $R^2$ is a substituted or unsubstituted monovalent hydrocarbon group of 1 to 10 carbon atoms, b is a positive number of 0.7 to 2.1, c is a positive number of 0.001 to 1.0, and b+c is 0.8 to 3.0. The monovalent hydrocarbon groups of $R^2$ are as exemplified for $R^1$ and preferably free of aliphatic unsaturation. Preferably, b is a positive number of 0.8 to 2.0, c is a positive number of 0.01 to 1.0, and b+c is 1.0 to 2.5. The organohydrogenpolysiloxane has a molecular structure which may be linear, cyclic, branched or three-dimensional network. The preferred organohydrogenpolysiloxane is liquid at room temperature (25° C.) and has a number of silicon atoms (or degree of polymerization) of about 2 to about 300, more preferably about 4 to about 150. The hydrogen atom may be bonded to a silicon atom at the end or an intermediate of the molecular chain or both.

Instead of or in addition to the organohydrogenpolysiloxane having formula (2), a resinous copolymer predominantly comprising $R''_2HSiO_{1/2}$ units and $SiO_2$ units, or a resinous copolymer predominantly comprising $R''_2HSiO_{1/2}$ units, $R''_3SiO_{1/2}$ units, and $SiO_2$ units may be used. Herein R" is a substituted or unsubstituted monovalent hydrocarbon group, which is as exemplified above for R', and preferably free of alkenyl. This resinous copolymer may consist of $R''_2HSiO_{1/2}$ units and $SiO_2$ units, or $R''_2HSiO_{1/2}$ units, $R''_3SiO_{1/2}$ units, and $SiO_2$ units, and may optionally further contain $R''HSiO_{2/2}$ units, $R''_2SiO_{2/2}$ units, $HSiO_{3/2}$ units, and $R''SiO_{3/2}$ units in a total amount of up to 50%, preferably up to 40% of the total weight of the copolymer. A molar ratio of $R''_2HSiO_{1/2}$ and $R''_3SiO_{1/2}$ units to $SiO_2$ units, $[(R''_2HSiO_{1/2}+R''_3SiO_{1/2})/SiO_2]$ is preferably 0.5/1 to 1.5/1, more preferably 0.5 to 1.3.

Examples of the organohydrogenpolysiloxane (D) include, but are not limited to, trimethylsiloxy-endcapped methylhydrogenpolysiloxane, trimethylsiloxy-endcapped dimethylsiloxane-methylhydrogensiloxane copolymers, dimethylhydrogensiloxy-endcapped dimethylpolysiloxane, dimethylhydrogensiloxy-endcapped dimethylsiloxane-methylhydrogensiloxane copolymers, trimethylsiloxy-endcapped methylhydrogensiloxane-diphenylsiloxane copolymers, trimethylsiloxy-endcapped methylhydrogensiloxane-diphenylsiloxane-dimethylsiloxane copolymers, copolymers of $(CH_3)_2HSiO_{1/2}$ units and $SiO_{4/2}$ units, and copolymers of $(CH_3)_2HSiO_{1/2}$ units, $SiO_{4/2}$ units, and $(C_6H_5)SiO_{3/2}$ units. As used herein and throughout the disclosure, the term "endcapped" means that a compound is capped at both ends with the indicated group unless otherwise stated.

The organohydrogenpolysiloxane as component (D) is blended in an amount of 0.5 to 30 parts, preferably 0.6 to 20 parts by weight per 100 parts by weight of components (A) and (B) combined. Outside the range, rubber strength is lost. Also preferably the organohydrogenpolysiloxane (D) is blended in such an amount that a molar ratio of SiH groups in component (D) to silicon-bonded alkenyl groups in components (A), (B) and (C) may range from 0.2 to 1.5, more preferably from 0.25 to 1.2, and even more preferably from 0.3 to 0.9.

Component (E) is an addition reaction catalyst. Suitable catalysts include platinum based catalysts such as platinum black, platinic chloride, chloroplatinic acid, reaction products of chloroplatinic acid with monohydric alcohols, complexes of chloroplatinic acid with olefins, complexes of chloroplatinic acid with vinylsiloxanes, and platinum bisacetoacetate; palladium based catalysts, and rhodium based catalysts. The addition reaction catalyst may be used in a catalytic amount, and typically in such an amount to provide 0.5 to 1,000 ppm, more preferably 1 to 500 ppm of platinum group metal based on the total weight of components (A), (B), and (C).

In a preferred embodiment, the PSA layer has a hardness which is lower than that of the rubber base and in a range of 1 to 60, more preferably 2 to 55, and even more preferably 2 to 40 on Asker C hardness scale. An Asker C hardness of less than 1 may lead to a poor rubber strength whereas an Asker C hardness in excess of 60 may lead to a loss of pressure-sensitive adhesion.

Also in a preferred embodiment, the PSA layer has a bond strength of 0.5 to 10 N/25 mm, more preferably 0.7 to 8 N/25 mm, when tested according to JIS Z0237 by pressure bonding the layer to glass (FL2.0, by Nippon Sheet Glass Co., Ltd.) and peeling at a peel rate of 300 mm/min and an angle of 180°. With a bond strength of less than 0.5 N/25 mm, when the PSA layer is attached to a certain member, the adhesive force thereto is low, giving rise to an attachment problem. A bond strength of more than 10 N/25 mm may deprive the layer of rework and re-attachment capabilities.

In addition to the components mentioned above, the rubber base-forming composition and the PSA layer-forming composition may further comprise optional components. Suitable components include fillers such as fumed silica, precipitated silica, ground quartz, diatomaceous earth, and calcium carbonate, electroconductive agents such as carbon black, conductive zinc white, and metal powders, and heat resistant agents such as iron oxide and cerium oxide. Also useful are hydrosilylation reaction regulators such as nitrogen-containing compounds, acetylene compounds, phosphorus compounds, carboxylates, tin compounds, mercury compounds, and sulfur compounds, internal parting agents such as dimethylsilicone oil, tackifiers, and thixotropic agents.

The rubber base typically has a thickness of 0.2 to 5 mm, preferably 0.5 to 3 mm. A thickness of less than 0.2 mm may fail to take advantage of sheet elasticity whereas a thickness in excess of 5 mm leads to an increased weight, adversely affects attachment and is costly. The PSA layer preferably has a thickness of 0.3 to 3 mm, more preferably 0.5 to 2 mm. A PSA layer of less than 0.3 mm, when applied to a member, may fail to accommodate surface irregularities of the member. A PSA layer of more than 3 mm may give rise to rubber failure because the rubber strength at the attachment interface depends on the PSA layer.

The waterproof sheet of the invention is prepared by first forming a rubber base. The rubber base may be formed as a single layer using a suitable rubber composition, typically silicone rubber composition, or as a composite layer with a layer of metals or various resins. For example, a sheet is directly formed by compression molding, casting, injection molding or the like; a sheet is formed on a metal substrate, resin substrate or resin film by insert molding; or a rubber sheet integrated with another substrate is formed by dipping, coating, calendering, screen printing or the like. Of these techniques, calendering may be advantageously used.

Next, the rubber base is overlaid with the PSA layer. In one procedure, the rubber base composition is cured into a rubber base before the PSA layer is formed thereon. In an alternative procedure, the rubber base composition is calendered or sheeted onto a film such as polyethylene terephthalate (PET), and the PSA composition is deposited on the unvulcanized rubber base composition.

The PSA composition is deposited on the rubber base layer to form a laminate sheet by a suitable technique such as dipping, coating or screen printing. Of these techniques, a layer may be advantageously formed by coating. The coating is preferably cured at a temperature of 80 to 250° C. for 10 seconds to 1 hour. This may be followed by post-curing at 120° C. to 250° C. for 1 to 100 hours for the purpose of removing a lower molecular weight siloxane fraction.

Referring to FIG. 1, a waterproof sheet 10 generally includes a rubber base 1, a PSA layer 2 disposed on rubber base 1, and a cover film 3 such as polyethylene terephthalate (PET) sheet lying on PSA layer 2 in a releasable manner. On use, the cover film 3 is peeled, and the PSA layer 2 is attached to the desired member.

Figure 2:
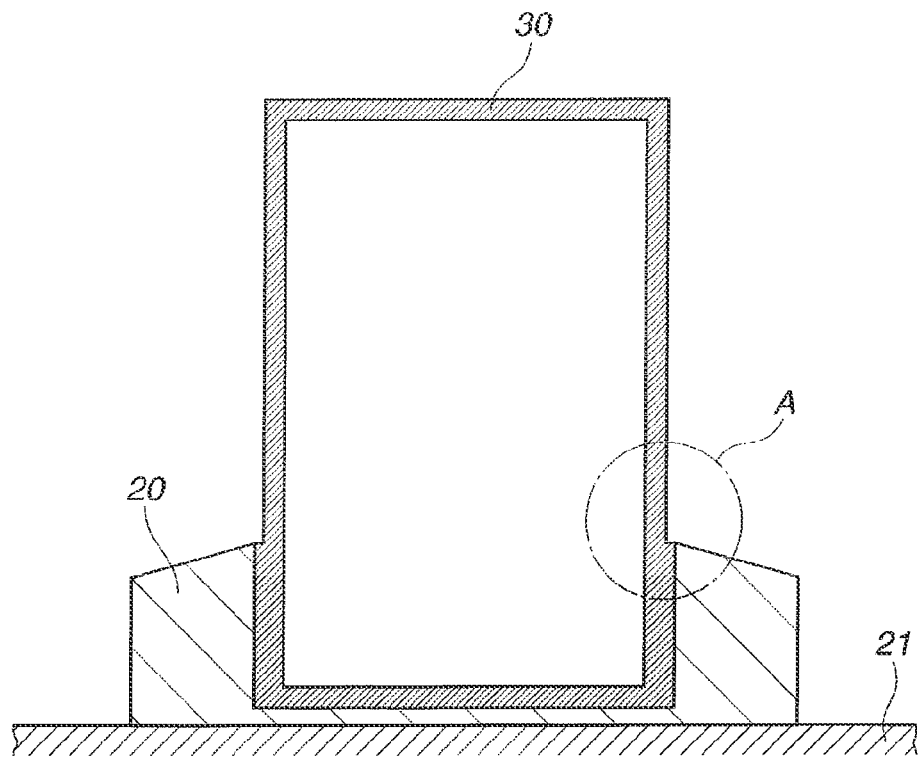
FIG. 2 is a schematic cross-sectional view of an outdoor tank resting on a pedestal.
Figure 3:
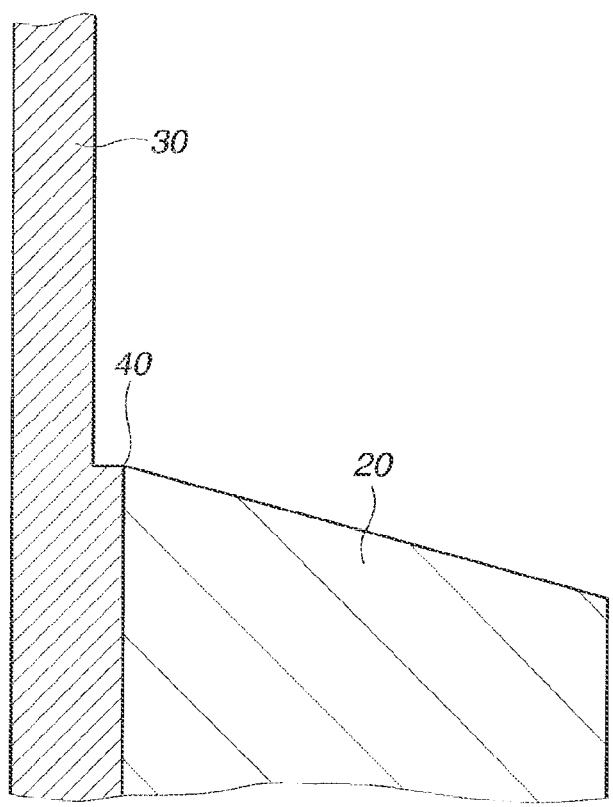
FIG. 3 is an enlarged view of circle A in FIG. 2.
Figure 4:
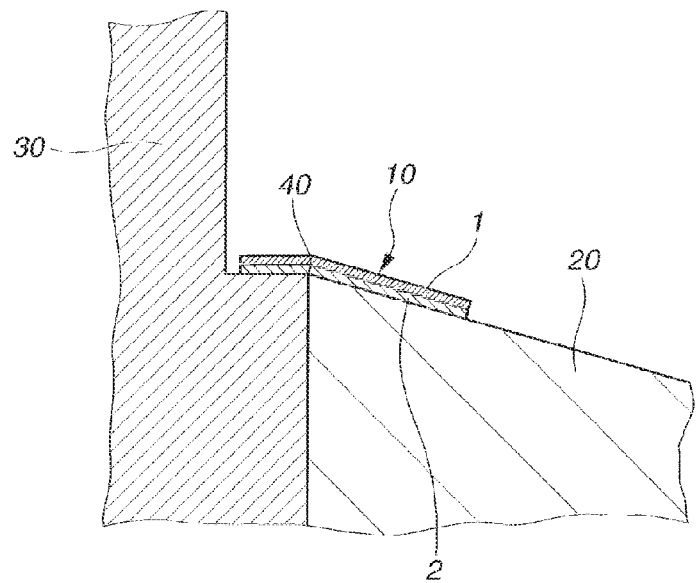
FIG. 4 is a schematic cross-sectional view of a waterproof sheet covering the boundary between an outdoor tank and a concrete pedestal.
Figure 5:
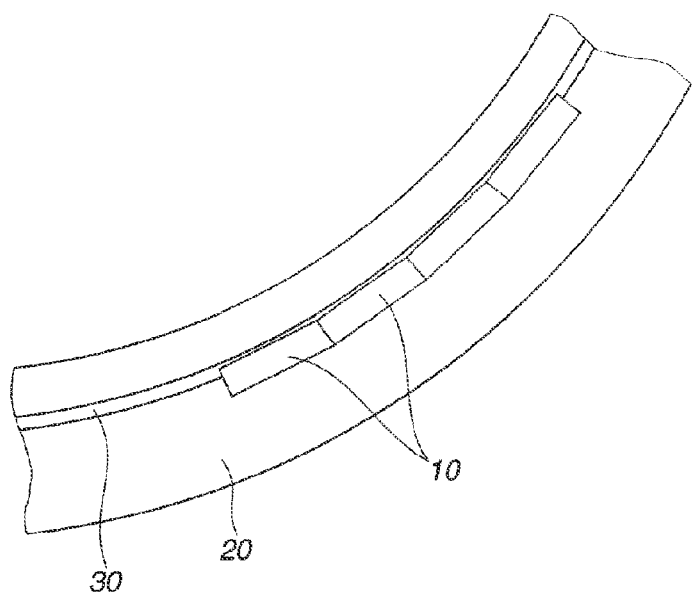
FIG. 5 is a plan view of the waterproof sheet of FIG. 4.
Figure 6:
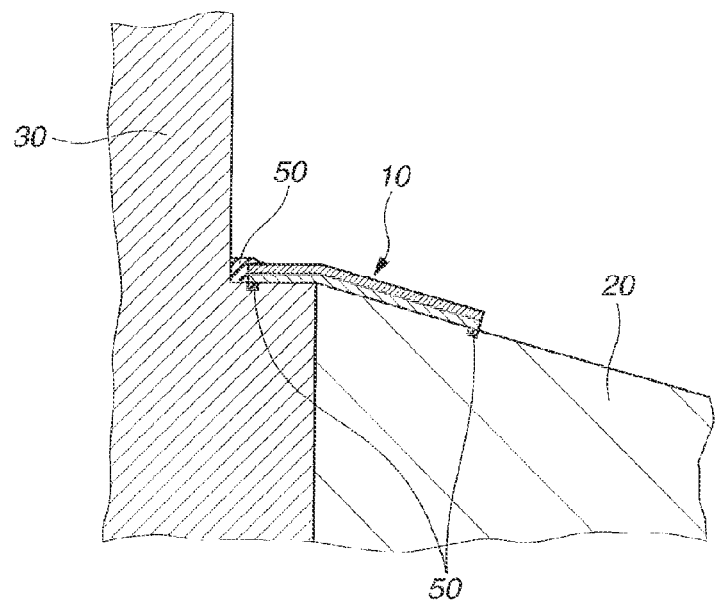
FIG. 6 is a schematic cross-sectional view of the waterproof sheet of FIG. 4 on which a sealing layer is formed.
Figure 7:
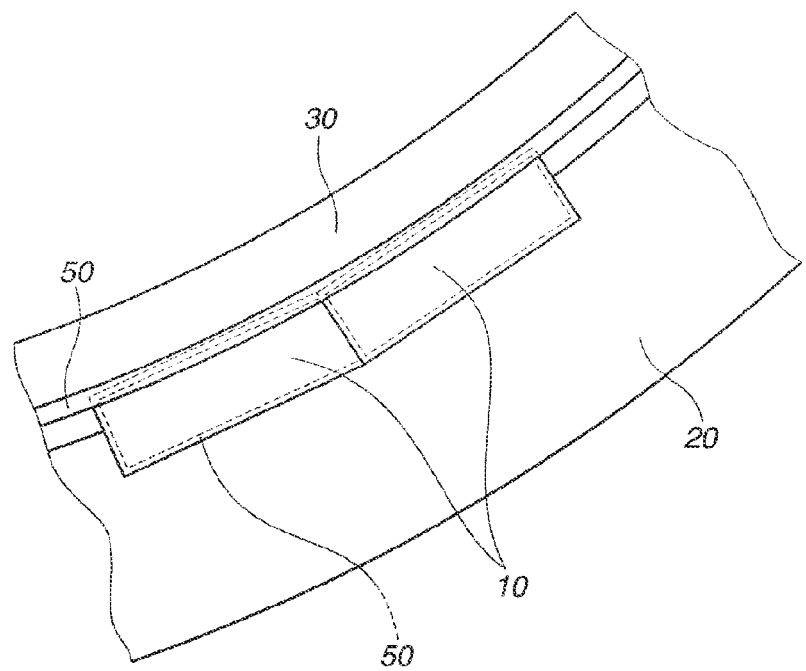
FIG. 7 is a plan view of the waterproof sheet and sealing layer of FIG. 6, assuming that the waterproof sheet is transparent.

The waterproof sheet may be applied to the boundary between an outdoor tank at its bottom and a concrete pedestal for the purpose of preventing entry of rainwater. Referring to FIGS. 2 to 7, one exemplary method is described. FIG. 2 shows an outdoor tank 30 of steel resting on and supported by a concrete pedestal 20. The outdoor tank 30 is intended to contain a feedstock such as petroleum oils, asphalt, and gases. The tank 30 is generally cylindrical, has a diameter of 10 to 80 meters and a height of 10 to 50 meters, and is rested on the concrete pedestal 20 on the ground depicted at 21. FIG. 3 is an enlarged view of circle A in FIG. 2. A boundary 40 is defined between the outdoor tank 30 near its bottom and the concrete pedestal 20 and exposed to the exterior, and so rainwater may enter the boundary 40. On rainwater entry, the tank 30 will rust. As shown in FIGS. 4 and 5, the waterproof sheet 10 is applied across the externally exposed boundary 40. Specifically, the waterproof sheet 10 is applied by peeling the cover film 3 therefrom, and attaching the sheet so as to bring the PSA layer 2 in contact with the surfaces of tank 30 and pedestal 20 and to cover the boundary 40. More specifically, a plurality of waterproof sheets 10 are circumferentially arranged on the boundary 40 as viewed in the plan view of FIG. 5. Further preferably, a sealant is applied around the waterproof sheet 10. As shown in FIGS. 6 and 7, a sealant 50 is applied along the outer periphery of each waterproof sheet 10. Notably the sealant 50 also serves to bond the waterproof sheet 10 to the tank 30 and pedestal 20. The method employed to this end is, as shown in FIG. 6, by turning up an outer periphery portion of each waterproof sheet 10 so that the outer periphery portion is slightly spaced apart from pedestal 20 or tank 30 and feeding a sealant 50 into the gap between sheet 10 and pedestal 20 or tank 30 for forming a sealing layer 50 along the outer periphery of each waterproof sheet 10. The sealant may be additionally applied so as to fill the space between tank 30 and the edge of sheet 10 as shown in FIGS. 6 and 7.

The sealant used herein is not particularly limited. Any of well-known silicone, polysulfide and polyurethane base sealants may be used, with the silicone base sealants being preferred for affinity to the waterproof sheet materials. Suitable sealants are commercially available. For example, silicone base sealants are commercially available as Sealant Master 300, Sealant 70 and Sealant 701 from Shin-Etsu Chemical Co., Ltd.

The waterproof sheet of the invention can be applied to the desired member without a need for primer, which leads to a substantial saving of the construction time.

With respect to the tanks installed in refinery and other plants, it is legally required to mount a rainwater-proofing means at the tank-pedestal junction (commonly known as annular plate) between the tank at its bottom and the tank-supporting pedestal. The water-proofing means is most commonly an array of butyl rubber sheets. However, when the member surface is wetted under the environment where water droplets are condensed due to a weather temperature difference or a very high humidity resulting from rain and snow, the butyl rubber sheets cannot be applied until the member surface is dried. The primer-less application ability of the waterproof sheet of the invention ensures that even when the member surface is wet, the sheet can be applied to the member surface simply after the member surface is wiped with fabrics or wastes. Application of the waterproof sheet can be started immediately after the weather becomes good.

In general, the oil or hazardous stock-containing large-volume tanks installed in refinery and other plants must be inspected for safety management every several years, as prescribed in the Fire Service Act of Japan, for example. On such inspection, the rainwater-proofing means must be detached before the junction can be observed. Since the currently used butyl rubber sheets, sealants, and other waterproof sheets have been applied using primers, it is difficult to detach these sheets to see the underneath structure. Since the waterproof sheet of the invention exerts the waterproof function by virtue of pressure-sensitive adhesion, the sheet can be readily detached just after the securing sealant at the edge of the sheet is removed, whereupon the underneath structure is inspected. By virtue of pressure-sensitive adhesion, the waterproof sheet of the invention can be attached in place again to exert the waterproof function.

EXAMPLE

Examples are given below by way of illustration and not by way of limitation. All parts and % are by weight.

Example 1

A rubber base layer was formed from a transparent uncrosslinked dimethylsilicone rubber compound. Specifically, a dimethylsilicone rubber composition was prepared by providing 100 parts of a millable dimethylsilicone rubber compound KE-571-U (Shin-Etsu Chemical Co., Ltd., containing the majority of vinyl-containing dimethylpolysiloxane with a degree of polymerization of about 5,000, up to 40% of dry silica with a BET specific surface area of 200 $m^2/g$, and up to 10% of silanol-endcapped dimethylsiloxane oligomer with a molecular weight of up to 700 as a silica dispersant, the compound being free of phenyl), adding thereto 0.5/2.0 parts of addition or hydrosilylation reaction vulcanizing agent C-25A/B (Shin-Etsu Chemical Co., Ltd.), and milling on a two-roll mill. The composition was calendered onto an embossed PET film of 100 m thick to form a layer of 0.7 mm thick, and continuously heat cured in a heating furnace at 140° C. for 10 minutes, obtaining a sheet comprising a rubber base layer disposed on PET film.

A PSA layer was formed from a PSA composition. Specifically, the PSA composition was prepared by feeding into an agitation mixer 75 parts of dimethylvinylsiloxy-endcapped dimethylpolysiloxane (1) having an average degree of polymerization of 1,000, and a 50% toluene solution containing 25 parts of resinous copolymer (2) which is solid at room temperature (25° C.) and consists of $(CH_2=CH)(CH_3)_2SiO_{1/2}$ units, $(CH_3)_3SiO_{1/2}$ units and $SiO_2$ units wherein a molar ratio $[\{(CH_2=CH)(CH_3)_2SiO_{1/2}+(CH_3)_3SiO_{1/2}\}/SiO_2]$ is 0.85 and a $CH_2=CH-$ content is 0.0008 mol/g, mixing the contents for 30 minutes, and fully distilling off the toluene. To 100 parts of the resulting silicone rubber base were added 0.9 part of resinous copolymer (4) composed mainly of $(CH_3)_2HSiO_{1/2}$ units and $SiO_2$ units and having SiH groups, with a SiH content of 0.0090 mol/g as a crosslinker and 0.05 part of ethynyl cyclohexanol as a reaction regulator. Agitation was continued for 15 minutes. The resulting silicone rubber composition was combined with 0.1 part of a platinum catalyst (Pt concentration 1%), yielding the PSA composition.

The PSA composition was coated on the rubber base layer to a thickness of 1.0 mm using a comma coater, and heat cured in a heating furnace at 140° C. for 10 minutes, yielding a two-layer cured laminate sheet. The rubber base had a JIS A hardness of 70, and the PSA layer had an Asker C hardness of 15.

The base side PET film was peeled from the laminate sheet, leaving a waterproof sheet which was evaluated by several tests to be described later. The results are shown in Table 1.

In a waterproof test, the waterproof sheets of 30 cm wide by 100 cm long were serially applied along the boundary between an outdoor tank and a pedestal as shown in FIG. 6. A sealant, Sealant Master 300, was applied to bond a 2 cm peripheral portion of the waterproof sheet to the tank or pedestal. The structure was exposed to weather for a certain period (1 month, 1 year).

Example 2

A rubber base layer was formed from a transparent uncrosslinked dimethylsilicone rubber compound. Specifically, a dimethylsilicone rubber composition was prepared by providing 100 parts of a millable dimethylsilicone rubber compound KE-571-U (Shin-Etsu Chemical Co., Ltd., containing the majority of vinyl-containing dimethylpolysiloxane with a degree of polymerization of about 5,000, up to 40% of dry silica with a BET specific surface area of 200 m²/g, and up to 10% of silanol-endcapped dimethylsiloxane oligomer with a molecular weight of up to 700 as a silica dispersant, the compound being free of phenyl), adding thereto 0.5/2.0 parts of addition or hydrosilylation reaction vulcanizing agent C-25A/B (Shin-Etsu Chemical Co., Ltd.), and milling on a two-roll mill. The composition was sheeted by calendering onto an embossed PET film of 100 m thick to form an unvulcanized layer of 1.5 mm thick.

A PSA layer was formed from a PSA composition. Specifically, the PSA composition was prepared by feeding into an agitation mixer 50 parts of dimethylvinylsiloxy-endcapped dimethylpolysiloxane (1) having an average degree of polymerization of 1,000, a 50% toluene solution containing parts of resinous copolymer (2) which is solid at room temperature (25° C.) and consists of $(CH_2=CH)(CH_3)_2SiO_{1/2}$ units, $(CH_3)_3SiO_{1/2}$ units and $SiO_2$ units wherein a molar ratio $[\{(CH_2=CH)(CH_3)_2SiO_{1/2}+(CH_3)_3SiO_{1/2}\}/SiO_2]$ is 0.85 and a $CH_2=CH-$ content is 0.0008 mol/g, and a 50% toluene solution containing 25 parts of resinous copolymer (3) which is solid at room temperature (25° C.) and consists of $(CH_3)_3SiO_{1/2}$ units and $SiO_2$ units wherein a molar ratio $[(CH_3)_3SiO_{1/2}/SiO_2]$ is 0.75, mixing the contents for 30 minutes, and fully distilling off the toluene. To 100 parts of the resulting silicone rubber base were added 0.9 part of resinous copolymer (4) composed mainly of $(CH_3)_2HSiO_{1/2}$ units and $SiO_2$ units and having SiH groups, with a SiH content of 0.0090 mol/g as a crosslinker and 0.05 part of ethynyl cyclohexanol as a reaction regulator. Agitation was continued for 15 minutes. The resulting silicone rubber composition was combined with 0.1 part of platinum catalyst (Pt concentration 1%), yielding the PSA composition.

The PSA composition was coated on the unvulcanized rubber base composition coating to a thickness of 1.5 mm using a comma coater, and heat cured in a heating furnace at 140° C. for 10 minutes, yielding a two-layer cured laminate sheet. The rubber base had a JIS A hardness of 70, and the PSA layer had an Asker C hardness of 10.

The base side PET film was peeled from the laminate sheet, leaving a waterproof sheet which was evaluated as in Example 1. The results are also shown in Table 1.

Example 3

As in Example 1, a sheet comprising a rubber base layer of 0.7 mm thick disposed on PET film was obtained.

A PSA composition was prepared by feeding into an agitation mixer 70 parts of dimethylvinylsiloxy-endcapped dimethylpolysiloxane (1) having an average degree of polymerization of 450, and a 50% toluene solution containing parts of resinous copolymer (2) which is solid at room temperature (25° C.) and consists of $(CH_2=CH)(CH_3)_2SiO_{1/2}$ units, $(CH_3)_3SiO_{1/2}$ units and $SiO_2$ units wherein a molar ratio $[\{(CH_2=CH)(CH_3)_2SiO_{1/2}+(CH_3)_3SiO_{1/2}\}/SiO_2]$ is 0.85 and a $CH_2=CH-$ content is 0.0008 mol/g, mixing the contents for 30 minutes, and fully distilling off the toluene. To 100 parts of the resulting silicone rubber base were added 3.0 part of methylhydrogenpolysiloxane (5) having a SiH group on side chain (i.e., on a siloxane unit midway the molecular chain) having a degree of polymerization of 60 and a SiH content of 0.0055 mol/g as a crosslinker and 0.05 part of ethynyl cyclohexanol as a reaction regulator. Agitation was continued for 15 minutes. The resulting silicone rubber composition was combined with 0.1 part of platinum catalyst (Pt concentration 1%), yielding the PSA composition.

As in Example 1, a two-layer cured laminate sheet was obtained. The PSA layer had an Asker C hardness of 30.

The base side PET film was peeled from the laminate sheet, leaving a waterproof sheet which was evaluated as in Example 1. The results are also shown in Table 1.

Example 4

As in Example 1, a sheet comprising a rubber base layer of 0.7 mm thick disposed on PET film was obtained.

A PSA composition was prepared by feeding into a planetary mixer 60 parts of dimethylvinylsiloxy-endcapped dimethylpolysiloxane (1) having an average degree of polymerization of 300, 40 parts of resinous copolymer (3) which is solid at room temperature (25° C.) and consists of $(CH_3)_3SiO_{1/2}$ units and $SiO_2$ units wherein a molar ratio $[(CH_3)_3SiO_{1/2}/SiO_2]$ is 0.75, and 8 parts of hydrophobized fumed silica having a BET specific surface area of 110 m²/g (R-972 by Nippon Aerosil Co., Ltd.) as finely divided silica, mixing the contents for 30 minutes, and milling once on a three-roll mill. To 100 parts of the resulting silicone rubber base were added 0.99 part of methylhydrogenpolysiloxane (5) having a SiH group on side chain (i.e., on a siloxane unit midway the molecular chain) with a degree of polymerization of 20 and a SiH content of 0.0060 mol/g as a crosslinker and 0.05 part of ethynyl cyclohexanol as a reaction regulator. Agitation was continued for 15 minutes. The resulting silicone rubber composition was combined with 0.1 part of platinum catalyst (Pt concentration 1%), yielding the PSA composition.

As in Example 1, a two-layer cured laminate sheet was obtained. The PSA layer had an Asker C hardness of 40.

The base side PET film was peeled from the laminate sheet, leaving a waterproof sheet which was evaluated as in Example 1. The results are also shown in Table 1.

Example 5

As in Example 1, a sheet comprising a rubber base layer of 0.7 mm thick disposed on PET film was obtained.

A PSA composition was prepared. To 100 parts of the silicone rubber base obtained as in Example 1 were added 0.5 part of resinous copolymer (4) composed mainly of $(CH_3)_2HSiO_{1/2}$ units and $SiO_2$ units and having SiH groups, with a SiH content of 0.0090 mol/g as a crosslinker, 1.5 parts of methylhydrogenpolysiloxane (5) having a SiH group on side chain (i.e., on a siloxane unit midway the molecular chain) with a degree of polymerization of 60 and a SiH content of 0.0055 mol/g as a crosslinker, and 0.05 part of ethynyl cyclohexanol as a reaction regulator. Agitation was continued for 15 minutes. The resulting silicone rubber composition was combined with 0.1 part of platinum catalyst (Pt concentration 1%), yielding the PSA composition.

As in Example 1, a two-layer cured laminate sheet was obtained. The PSA layer had an Asker C hardness of 20.

The base side PET film was peeled from the laminate sheet, leaving a waterproof sheet which was evaluated as in Example 1. The results are also shown in Table 1.

Comparative Example 1

A commercially available butyl rubber based PSA sheet of the same size as in Example 1 was applied as in Example 1.

Tests

Pressure-Sensitive Adhesion

The waterproof sheet was cut into samples of 25 mm wide by 10 cm long. According to JIS Z0237, the sample was attached to a 4-mm thick plate of glass FL2.0 (Nippon Sheet Glass Co., Ltd.) which had been degreased with alcohol and air dried, with the PSA layer in contact with the glass plate. A bond strength was measured by peeling the PSA layer from the glass plate at room temperature, a rate of 300 mm/min, and an angle of 180°.

Long-Term Attachment Stability

As above, the waterproof sheet sample of 25 mm wide by cm long was attached to a 4-mm thick glass plate, with the PSA layer in contact with the glass plate. The assembly was stored at room temperature and a humidity of 50% RH for one month. A bond strength was then measured by peeling the PSA layer from the glass plate at room temperature, a rate of 300 mm/min, and an angle of 180°.

Re-Peeling

As above, the waterproof sheet sample of 25 mm wide by cm long was attached to a 4-mm thick glass plate, with the PSA layer in contact with the glass plate. The assembly was stored at room temperature and a humidity of 50% RH for one month. The PSA layer was peeled from the glass plate at room temperature, a rate of 300 mm/min, and an angle of 180°. It was examined whether or not any sticky component was transferred to the glass surface. The sample was rated NG when transferred or OK when not transferred.

Elasticity to Deformation

The waterproof sheet was bent 180° whereupon it was examined whether or not the sheet was damaged. The sample was rated OK when the sheet was intact or NG when cracked and deformed.

Waterproofness

Initial waterproofness was evaluated after one month of weathering and rated OK for no rainwater entry or NG when rainwater entry was found.

Long-term waterproofness was evaluated after one year of weathering and rated OK for no rainwater entry or NG when rainwater entry was found.

TABLE 1

| | Example | | | | | Comparative Example |
|---|---|---|---|---|---|---|
| | 1 | 2 | 3 | 4 | 5 | 1 |
| Bond strength (N/25 mm) | 3.1 | 4.6 | 3.3 | 3.1 | 3.2 | 0.2 |
| Long-term attachment stability (N/25 mm) | 3.0 | 3.5 | 3.3 | 3.0 | 3.3 | 0.1 |
| Re-peeling | OK | OK | OK | OK | OK | OK |
| Elasticity to deformation | OK | OK | OK | OK | OK | OK |
| Initial waterproofness | OK | OK | OK | OK | OK | OK |
| Long-term waterproofness | OK | OK | OK | OK | OK | NG |

Japanese Patent Application No. 2011-077757 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A waterproof structure of an outdoor tank comprising the outdoor tank, a concrete pedestal, a waterproof sheet comprising a pressure-sensitive adhesive layer, and a sealant,
    the outdoor tank resting on the concrete pedestal and the waterproof sheet being applied across an externally exposed boundary between the tank and the pedestal, with the pressure-sensitive adhesive layer of the waterproof sheet being directly attached to the tank and the pedestal without a primer,
    the sealant being a silicone sealant and applied along the outer periphery of the pressure-sensitive adhesive layer of the waterproof sheet to form a sealing layer at the outer periphery of the pressure-sensitive adhesive layer,
    wherein the waterproof sheet comprises an elastic silicone rubber base sheet having a thickness of 0.2 to 5 millimeters, said silicone rubber base sheet having a hardness of 10 to 90 on the JIS A scale, with
    the pressure-sensitive adhesive layer having a thickness of 0.3 to 3 millimeters and a bond strength to glass of 0.7 to 8 N/25 mm disposed on only one surface of said base sheet, the hardness of the pressure-sensitive adhesive layer being in a range of 1 to 40 on the Asker C hardness scale and being lower than the hardness of the rubber base, wherein the adhesive layer comprises a pressure-sensitive adhesive silicone resin or gel and being formed of a cured product of an addition cure silicone rubber composition which contains no fillers and wherein the only silicon-containing components are
    (A) 20 to 100 parts by weight of an organopolysiloxane containing at least two silicon-bonded alkenyl groups in a molecule, having the average compositional formula (1):

  (1)

wherein each $R^1$ is independently a monovalent hydrocarbon group of 1 to 10 carbon atoms or a $C_{1-10}$ monovalent hydrocarbon group in which at least one hydrogen atom is replaced by a halogen atom or cyano radical, and a is a positive number of 1.5 to 2.8, wherein said organopolysiloxane has an average degree of polymerization of 100 to 2,000,
(B) 0 to 80 parts by weight of a resinous copolymer predominantly comprising $R_3SiO_{1/2}$ units and $SiO_2$ units, a molar ratio of $R_3SiO_{1/2}$ units to $SiO_2$ units being in a range of 0.5 to 1.5, wherein R is a monovalent hydrocarbon group or a monovalent hydrocarbon group in which at least one hydrogen atom is replaced by a halogen atom or cyano radical, and R contains alkenyl in a total amount of at least 0.0001 mol/g,
the total amount of components (A) and (B) being 100 parts by weight,
(C) 0 to 400 parts by weight, relative to 100 parts by weight of components (A) and (B) combined, of a resinous copolymer predominantly comprising $R'_3SiO_{1/2}$ units and $SiO_2$ units, a molar ratio of $R'_3SiO_{1/2}$ units to $SiO_2$ units being in a range of 0.5 to 1.5, wherein R' is a monovalent hydrocarbon group or a monovalent hydrocarbon group in which at least one hydrogen atom is replaced by a halogen atom or cyano radical, and R' does not contain or contains alkenyl in a total amount of less than 0.0001 mol/g, in an amount of 0 to 400 parts by weight relative to 100 parts by weight of components (A) and (B) combined, the amount being such that a molar ratio of silicon-bonded hydrogen in component (D) to silicon-bonded alkenyl group in components (A), (B), and (C) is in a range of 0.32 to 0.75 when component (C) contains alkenyl,
(D) an organohydrogenpolysiloxane containing at least two silicon-bonded hydrogen atoms in a molecule in an amount of 0.5 to 30 parts by weight relative to 100 parts by weight of components (A) and (B) combined, the amount being such that a molar ratio of silicon-bonded hydrogen in component (D) to silicon-bonded alkenyl group in components (A) and (B) is in a range of 0.2 to 1.5, and
(E) an addition reaction catalyst in an amount which provides 0.5 to 1,000 ppm of platinum group metal based upon the total weight of components (A), (B), and (C).

2. The waterproof structure of claim 1, wherein said addition cure silicone rubber composition includes component (C).

3. The waterproof structure of claim 2, which further comprises a hydrosilylation reaction regulator.

4. The waterproof structure of claim 1, wherein components (A) and (B) are compounded in such amounts that component (A) is 30 to 90 parts by weight and component (B) is 10 to 70 parts by weight of said addition cure silicone rubber composition.

5. The waterproof structure of claim 1, wherein component (D) is a resinous copolymer predominantly comprising $R''_2HSiO_{1/2}$ units and $SiO_2$ units or is a resinous copolymer predominantly comprising $R''_2HSiO_{1/2}$ units, $R''_3SiO_{1/2}$ units, and $SiO_2$ units, wherein R'' is a substituted or unsubstituted monovalent hydrocarbon group free of alkenyl moieties, and wherein a molar ratio of $R''_2HSiO_{1/2}$ and $R''_3SiO_{1/2}$ units to $SiO_2$ units is 0.5/1 to 1.5/1.

6. The waterproof structure of claim 1, which further comprises a hydrosilylation reaction regulator.

7. A waterproof structure of an outdoor tank comprising the outdoor tank, a concrete pedestal, a waterproof sheet comprising a pressure-sensitive adhesive layer, and a sealant,
the outdoor tank resting on the concrete pedestal and the waterproof sheet being applied across an externally exposed boundary between the tank and the pedestal, with the pressure-sensitive adhesive layer of the waterproof sheet being directly attached to the tank and the pedestal without a primer,
the sealant being a silicone sealant and applied along the outer periphery of the pressure-sensitive adhesive layer of the waterproof sheet to form a sealing layer at the outer periphery of the pressure-sensitive adhesive layer,
wherein the waterproof sheet comprises an elastic silicone rubber base sheet having a thickness of 0.2 to 5 millimeters, said silicone rubber base sheet having a hardness of 10 to 90 on the JIS A scale, with
the pressure-sensitive adhesive layer having a thickness of 0.3 to 3 millimeters and a bond strength to glass of 0.7 to 8 N/25 mm disposed on only one surface of said base sheet, the hardness of the pressure-sensitive adhesive layer being in a range of 1 to 40 on the Asker C hardness scale and being lower than the hardness of the rubber base, wherein the adhesive layer comprises a pressure-sensitive adhesive silicone resin or gel and being formed of a cured product of an addition cure silicone rubber composition consisting of
(A) 20 to 100 parts by weight of an organopolysiloxane containing at least two silicon-bonded alkenyl groups in a molecule, having the average compositional formula (1):

  (1)

wherein each $R^1$ is independently a monovalent hydrocarbon group of 1 to 10 carbon atoms or a $C_{1-10}$ monovalent hydrocarbon group in which at least one hydrogen atom is replaced by a halogen atom or cyano radical, and a is a positive number of 1.5 to 2.8, wherein said organopolysiloxane has an average degree of polymerization of 100 to 2,000,
(B) 0 to 80 parts by weight of a resinous copolymer predominantly comprising $R_3SiO_{1/2}$ units and $SiO_2$ units, a molar ratio of $R_3SiO_{1/2}$ units to $SiO_2$ units being in a range of 0.5 to 1.5, wherein R is a monovalent hydrocarbon group or a monovalent hydrocarbon group in which at least one hydrogen atom is replaced by a halogen atom or cyano radical, and R contains alkenyl in a total amount of at least 0.0001 mol/g,
the total amount of components (A) and (B) being 100 parts by weight,
(C) 0 to 400 parts by weight, relative to 100 parts by weight of components (A) and (B) combined, of a resinous copolymer predominantly comprising $R'_3SiO_{1/2}$ units and $SiO_2$ units, a molar ratio of $R'_3SiO_{1/2}$ units to $SiO_2$ units being in a range of 0.5 to 1.5, wherein R' is a monovalent hydrocarbon group or a monovalent hydrocarbon group in which at least one hydrogen atom is replaced by a halogen atom or cyano radical, and R' does not contain or contains alkenyl in a total amount of less than 0.0001 mol/g, in an amount of 0 to 400 parts by weight relative to 100 parts by weight of components (A) and (B) combined, the amount being such that a molar ratio of silicon-bonded hydrogen in component (D) to silicon-bonded alkenyl group in components (A), (B), and (C) is in a range of 0.32 to 0.75 when component (C) contains alkenyl, (D) an organohydrogenpolysiloxane containing at least two silicon-bonded hydrogen atoms in a molecule in an amount of 0.5 to 30 parts by weight relative to 100 parts by weight of components (A) and (B) combined, the amount being such that a molar ratio of silicon-bonded hydrogen in component (D) to silicon-bonded alkenyl group in components (A) and (B) is in a range of 0.2 to 1.5, (E) an addition reaction catalyst in an amount which provides 0.5 to 1,000 ppm of platinum group metal based upon the total weight of components (A), (B), and (C), and optionally, a hydrosilylation reaction regulator.

8. The waterproof structure of claim 7, wherein components (A) and (B) are compounded in such amounts that component (A) is 30 to 90 parts by weight and component (B) is 10 to 70 parts by weight of said addition cure silicone rubber composition.

9. The waterproof structure of claim 7, which does not contain component (C).

10. The waterproof structure of claim 7, which contains said hydrosilylation reaction regulator.

11. The waterproof structure of claim 7, which does not contain component (C) and which contains said hydrosilylation reaction regulator.

* * * * *